United States Patent
Klinkenberg

(10) Patent No.: US 6,364,597 B2
(45) Date of Patent: *Apr. 2, 2002

(54) HYDRAULIC LIFT FOR MOTOR HOME

(75) Inventor: Eric E. Klinkenberg, Stein (NL)

(73) Assignee: E & P Lifts Corporation, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/862,203

(22) Filed: May 23, 1997

(51) Int. Cl.[7] .................................................. B60P 1/26
(52) U.S. Cl. ....................................... 414/462; 414/917
(58) Field of Search ................................ 414/462, 917; 224/502, 924

(56) References Cited

U.S. PATENT DOCUMENTS

| | | | | |
|---|---|---|---|---|
| 3,754,672 A | * | 8/1973 | Blomquist et al. | 414/462 |
| 4,078,676 A | * | 3/1978 | Mortenson | 414/917 |
| 4,344,508 A | * | 8/1982 | Peck | 414/917 |
| 4,400,129 A | * | 8/1983 | Eisenberg et al. | 414/462 |
| 4,836,736 A | * | 6/1989 | Neagu | 414/917 |
| 4,898,510 A | * | 2/1990 | Weber | 414/917 |
| 4,909,700 A | * | 3/1990 | Fontecchio et al. | 414/917 |
| 5,456,564 A | * | 10/1995 | Bianchini | 414/462 |
| 5,641,262 A | * | 6/1997 | Dunlop et al. | 414/917 |
| 5,816,763 A | * | 10/1998 | Hamann et al. | 414/462 |

* cited by examiner

*Primary Examiner*—Douglas Hess
(74) *Attorney, Agent, or Firm*—Young & Thompson

(57) ABSTRACT

The hydraulic lift is provided for carrying structures, such as a motorcycle, snowmobile, etc., in an elevated position behind a motor home. The lift includes a fixed framework having pivotable arms to which any of a plurality of carrying platforms may be engaged. The arms pivot from a ground engaging position to an elevated, locked in place position under action of a hydraulic activation system.

10 Claims, 3 Drawing Sheets

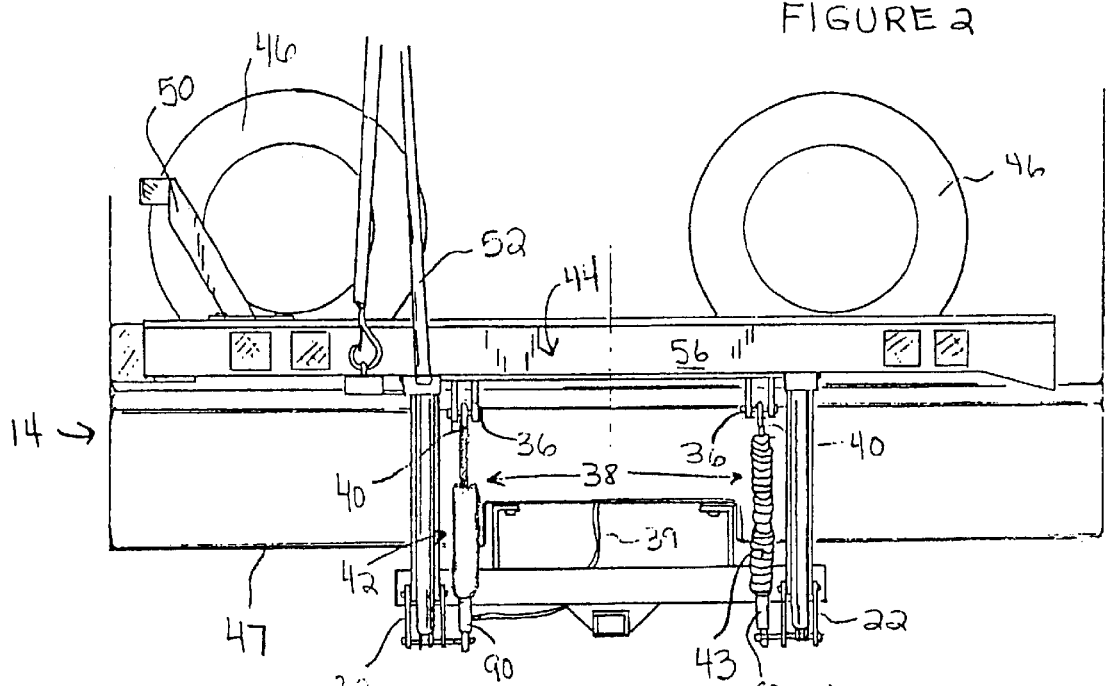
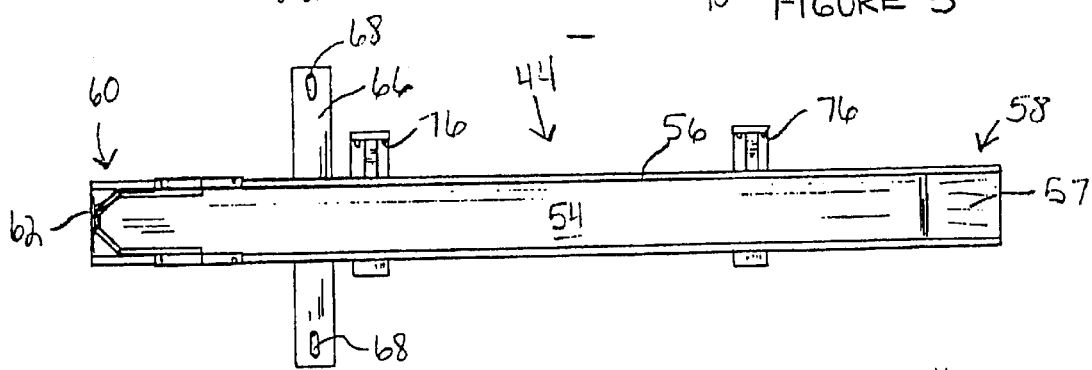
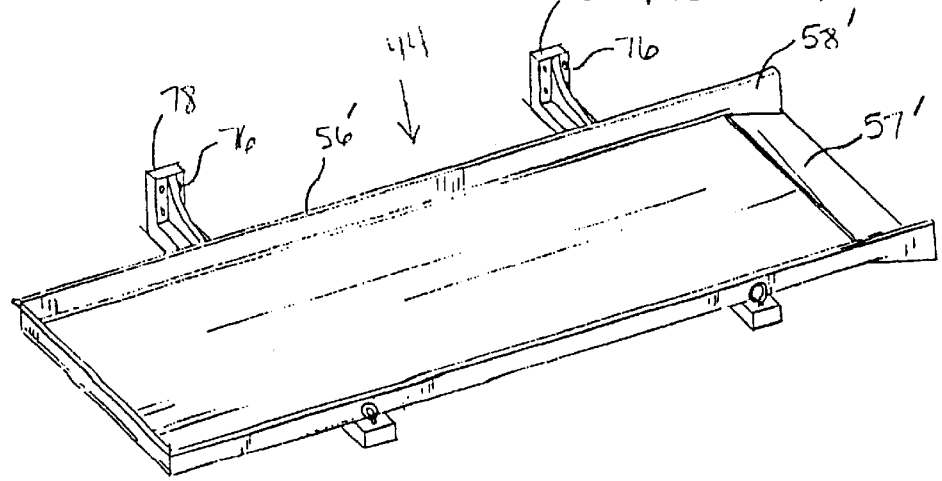

HYDRAULIC LIFT FOR MOTOR HOME

BACKGROUND OF THE INVENTION

1. Field of the Invention

The present invention relates to a hydraulic lift for a motor home. More particularly, the hydraulic lift is designed to carry a structure, such as a motorcycle, recreational vehicle, personal water craft, etc. in an elevated position behind a motor home to which the lift is attached.

2. Prior Art

Heretofore, various lift apparatus have been proposed for use in carrying a structure such as a vehicle behind a motor home in an elevated position.

For instance, the Blomquist et al U.S. Pat. No. 3,754,672 and the Bianchini U.S. Pat. No. 5,456,564 disclose collapsible motorcycle carrier hoists for a vehicle which are raised with a winch and locked in an elevated position. Also, the Eisenberg, et al U.S. Pat. No. 4,400,129 discloses a trunk mounted spring biased pivotable carrier which engages a structure to be carried by means of support forks which, once engaged, are brought upwardly against a rear of the truck under action of the springs.

As will be described in greater detail hereinafter, there has not been proposed a hydraulic lift which is actuated by mere flipping of a switch, which has a locking mechanism thereon separate from the lift mechanism, which accommodates a plurality of embodiments of structures to be carried, which need not be removed from the motor home when not in use, and which allows for a trailer to be engaged therebeneath for towing a following structure in normal fashion.

SUMMARY OF THE INVENTION

According to the invention there is provided a hydraulic lift for use in lifting and carrying a structure, such as a motorcycle or recreational vehicle, behind a motor home, the lift comprising a fixed framework engaged to a rear end of the motor home and having arms engageable to any of a plurality of structure engaging platforms, the arms being pivotable between a ground engaging position and an elevated, locked in place position, the arms being pivoted by actuation of a hydraulic system functionally engaged to and between the pivotable arms and the fixed framework.

BRIEF DESCRIPTION OF THE DRAWINGS

FIG. 2 is a rear view of the lift and motor home showing a first embodiment of a platform for engaging a motorcycle to the framework and showing arms of the lift positioned in an elevated condition, with wheels of a motorcycle shown resting thereon.

FIG. 3 is a top plan view of the platform of FIG. 2.

FIG. 4 is a top plan view of a second embodiment of a platform.

DESCRIPTION OF THE PREFERRED EMBODIMENT

Figure 1:
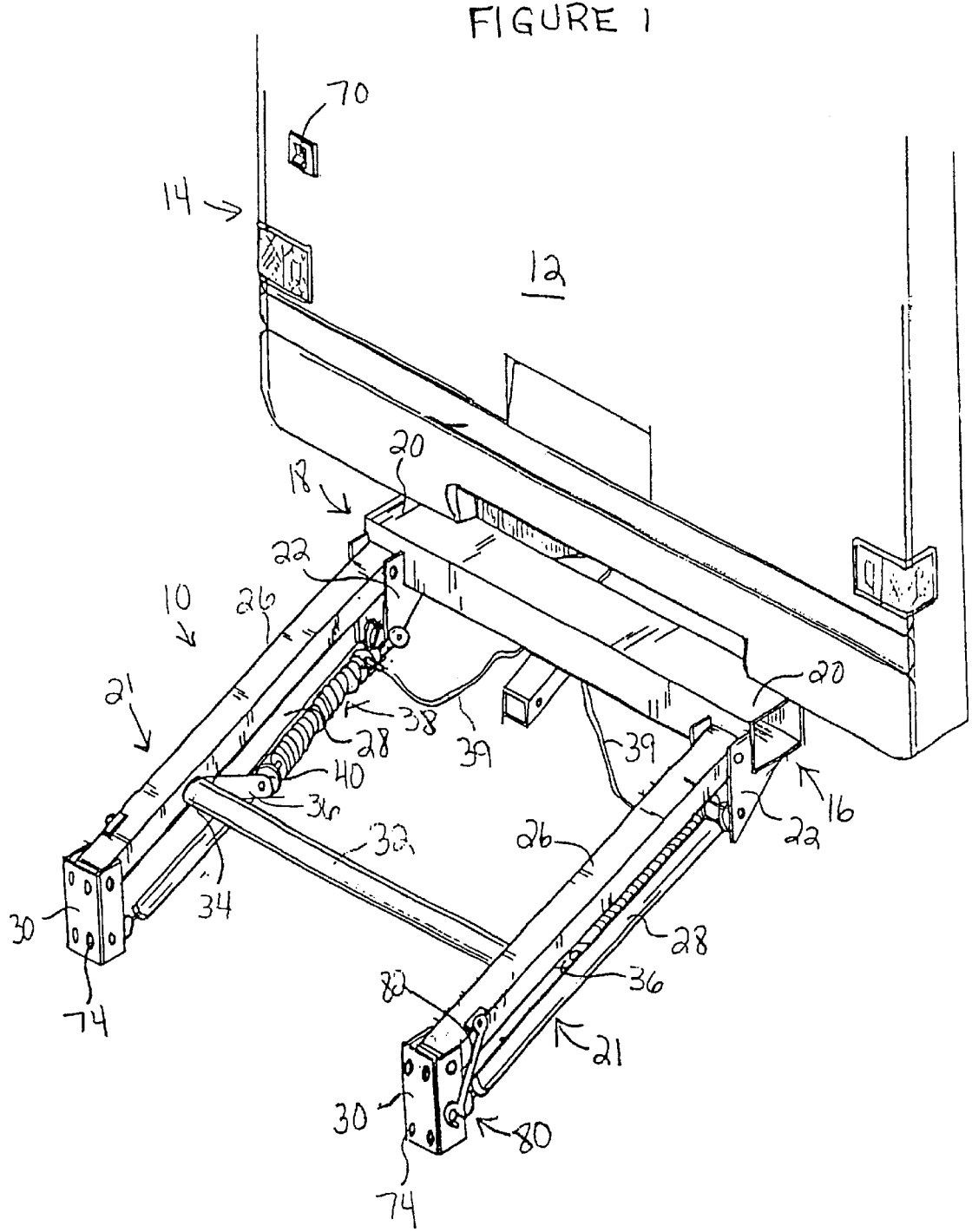
FIG. 1 is a perspective view of a fixed framework of the hydraulic lift of the present invention engaged to a rear end of a motor home.

Referring now to the drawings in greater detail there is illustrated therein the hydraulic lift of the present invention generally identified by the reference numeral 10, the lift 10 shown engaged to a rear end 12 of a motor home 14.

The lift includes a framework 16 which comprises a base 18 mounted to the motor home 14 and two arms 21 extending rearwardly outwardly from the base 18. The base 18 is a hollow metal tube 18 which in the preferred embodiment engages to structure (not shown) on the underside of the motor home 14 which typically supports a rear bumper (not shown) of the motor home 14, the bumper being removed prior to engaging the lift base 18 to the bumper mounts.

Extending rearwardly away from the motor home 14, at each end 20 of the base 18, is a mounting bracket 22, each mounting bracket 22 being configured to pivotably engage an arm 21 of the framework 16.

Each arm 21 of the framework 16 includes an upper shaft 26, a lower shaft 28, and a platform engaging bracket 30 engaged to and between the upper and lower shafts 26 and 28, respectively.

When viewed from the side, each arm 21 is configured as a parallelogram, with the brackets 22 and 30 remaining parallel to one another regardless of the position to which the arm 21 is pivoted about its engagement to mounting bracket 22.

Engaged to and extending between the upper shafts 26 of each arm 21 is a support rod or cross brace 32 which maintains the arms 21 parallel. Depending from this rod 32, at a position toward each end 34 thereof, is a downwardly and forwardly angled finger 36. Engaged to and extending between each finger 36 and its corresponding mounting bracket 22 is a hydraulic piston and cylinder arrangement 38, such arrangement 38 being mounted to the mounting bracket 22 in a manner to be pivotable relative thereto, corresponding in pivotability to that of the arms 21 of the framework 16. Each piston and cylinder arrangement 38 is functionally engaged by tubes 39 to a source of hydraulic fluid, (not shown) such source either already existing as a component of the motor home 14 or being provided as a separate entity, as desired.

In use of the lift 10, a piston 40 is seated within a cylinder 42 of each piston and cylinder arrangement 38 when the platform engaging brackets 30 rest on a surface (not shown) subjacent the motor home 14, and the piston 40 is extended by application of pressurized hydraulic fluid into the cylinder 42, when rotational elevation of the arms 21 is desired, as will be described in greater detail hereinafter. Also, if desired, a dust sleeve 43 may be provided about the piston and cylinder arrangements 38.

The platform engaging brackets 30 are provided in a configuration which will accommodate engagement of more than one embodiment of a carrying platform 44 thereto.

In this respect, FIGS. 2 and 3 disclose a first embodiment of a platform 44 configured for secure engagement of wheels 46 of a motorcycle (not shown) thereto. A further embodiment of a platform 44' for secure engagement of a snowmobile, personal water craft, etc. (not shown), is disclosed. Although only two preferred platform embodiments 44 and 44' are disclosed, this should not be construed as limiting. For instance, a bicycle rack type structure for dependingly engaging at least one bicycle could also be created and engaged to the platform engaging brackets 30.

As illustrated in FIG. 2 when the arms 21 are rotated upwardly about the brackets 22 the platform 44, 44' is lifted to a position well above a rear bottom end 47 of the motor home 14. A' pair of motorcycle wheels 46 are shown extending upwardly from the platform 44 and straps 50 and cables 52 are shown for securing the motorcycle wheels 46 to the platform 44 proposed for carrying same.

FIG. 3 shows a top plan view of the motorcycle platform 44. As shown, the platform 44 includes a narrow track 54 having upstanding sidewalls 56 and a ramp 57 at end 58, an opposite end 60 being of closed off configuration, by including an end wall 62, which may be configured to accept a circumferential portion of the motorcycle wheel 46 somewhat snugly therein.

Also, a cross member 66 is situated to extend outwardly of and beneath the platform 44, the cross member 66 being configured to provide structure 68, such as holes, hooks, etc., thereon to which the straps 50 and cables 52 can be easily engaged for securing the motorcycle wheels 46 to the platform 44.

In FIG. 4, the second embodiment of the platform 44' shows same to be a much wider, planar structure onto which a wider item (not shown), such as a snowmobile, etc., can be easily loaded. A ramp 57' is provided at one end 58' for ease in manipulating the item to be transported onto the platform 44'. Also, for maintaining the item within the confines of the platform 44', a small lip or sidewall 56' is provided on the platform 44'.

In use, arms 21 are first lowered to ground level by activation of any suitable means for controlling operation of the piston and cylinder arrangement 38, such as for example, engaging an up/down switch 70 located near the lift 10 to bring the arms 21 down. Next, a desired embodiment of the platform 44, 44', is engaged to the platform engaging brackets 30 by means of suitable connectors (not shown) passing through aligned holes 74 in the platform engaging brackets 30 and cooperating holes 76 in platform brackets 78 positioned on the platform 44, 44' to engage the platform engaging brackets 30, or cooperating holes created in the platform 44, 44' itself (not shown).

Once the platform 44, 44' is engaged to the arms 21, the item to be transported is moved onto the platform 44, 44' through use of the ramp 57, 57' and is fixed to the platform 44, 44' in a suitable manner.

One then again activates the switch 70, producing an upward pivoting of the arms 21, carrying the platform 44, 44' and item engaged thereon upwardly to a position which allows for engagement of a locking mechanism 80, used to lock the arms 21 in the elevated position, against any potential dropping thereof.

Figure 5:
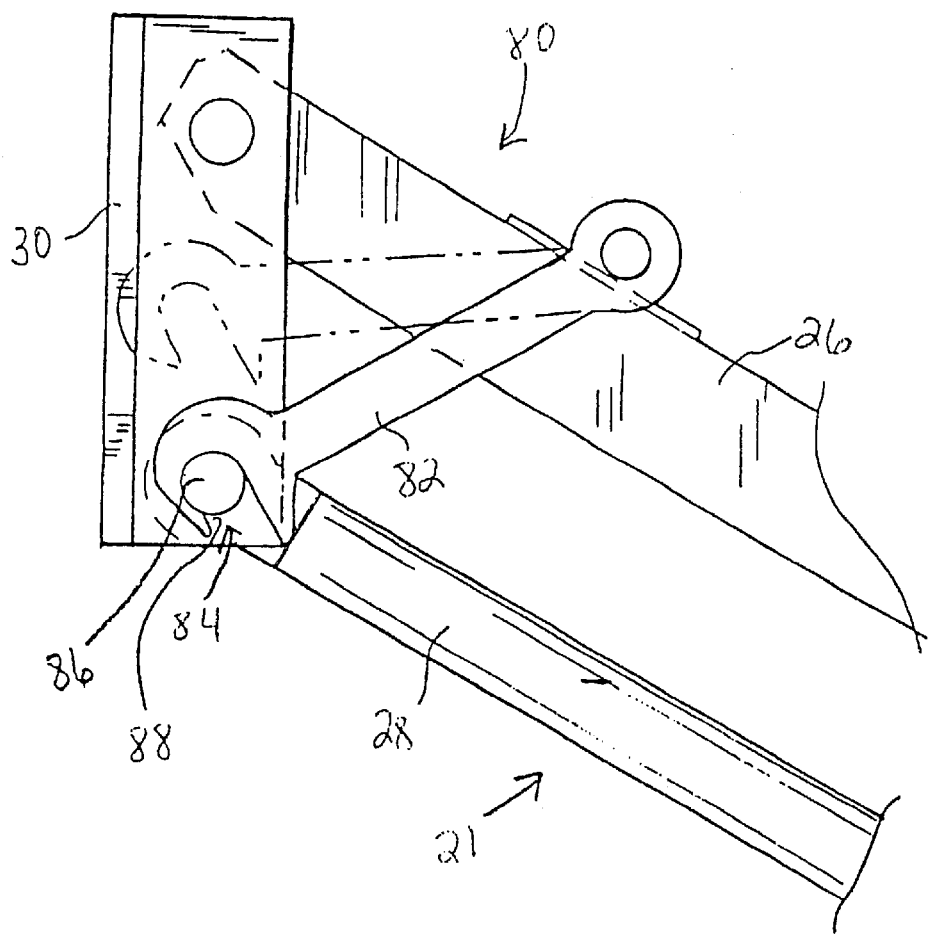
FIG. 5 is an enlarged view of a locking mechanism of the lift.

As best shown in FIG. 5, the locking mechanism 80 comprises a latch 82 rotatably engaged to the upper shaft 26 of each arm 21, which latch 82 has a jaw 84 thereon which engages over a pin or nub 86 on the platform engaging bracket 30, the angulation of the jaw 84 being such that, any attempt by the arm 21 to pivot downwardly will be thwarted by compression of the pin 86 against an engaged lip 88 of the jaw 84.

Engagement between the jaw 84 and the pin 86 is achieved manually by rotating the latch 82 into a position where the jaw 84 is above the pin 86 and then dropping the jaw 84 over the pin 86.

To disengage the jaw 84, one merely elevates the arms 21 a bit, decreasing frictional engagement between the downward force exerted by the pin 86 against the lip 88 and the latch 82 bearing the jaw 84 thereon is rotated upwardly, out of engagement over the pin 86.

The locking mechanism 80 preferably includes one jaw 84 and pin 86 engagement on each arm 21, such mechanism 80 functioning effectively due to the parallelogram configuration of the components of each arm 21.

As described above, the cross brace 32 including the depending fingers 36, each of which is engaged to an end of a corresponding piston and cylinder arrangement 38, creates the pivotal motion required for elevation of the arms 21.

In this respect, the fingers 36 are seen to be angled downwardly and forwardly, as related to the motor home 14.

When the pistons 40 are each pushed outwardly of their respective cylinders 42, they produce a rearwardly directed force against the angled fingers 36, since a mounting end 90 of each cylinder 42 is fixed in place. This force is translated along the fingers 36 to produce an upwardly and rearwardly directed force against the upper shaft 26 of each arm 21, causing such upper shaft 26 to rise. Because the upper shaft 26 and lower shaft 28 of each arm 21 are engaged to one another by the platform engaging bracket 30, as the upper shaft 26 rises, it carries the lower shaft 28 with it. Since the piston and cylinder arrangements 38 are pivotable about their point of engagement to the platform engaging bracket 22, continued extension of the piston 40 is possible, and elevation of the arm 21 continues as well.

Such activation is produced by engagement of the switch 70 which, in any known suitable manner, causes filling of the cylinder 42 with pressurized hydraulic fluid, forcing the piston 40 outwardly thereof. Conversely, when the switch 70 is activated to lower the lift arms 21, fluid is allowed to flow back to its source, such reverse flow being caused by retraction of the piston 40 under force of the weight of the item being carried by the lift 10.

It will also be understood that the platform engaging brackets 30 remain vertically oriented at all times, regardless of the position of the arms 21, due to the parallelogram configuration of the arm components as well.

Figure 6:
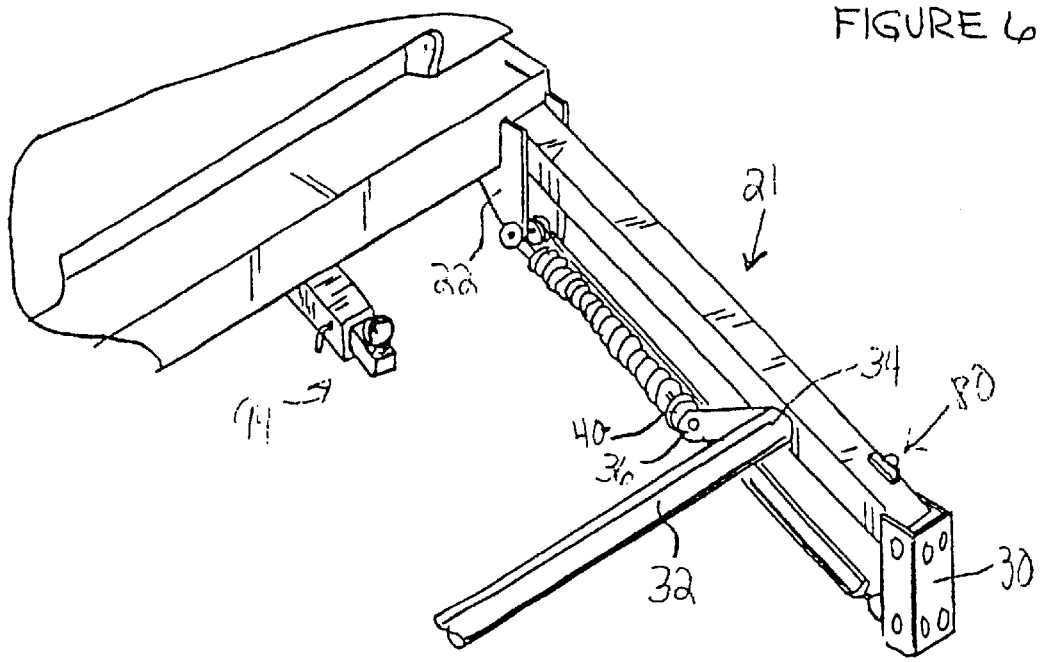
FIG. 6 is a perspective view of a portion of the lift framework showing a trailer hitch with ball extending rearwardly from a rear end of the motor home, beneath and between the arms of the lift.

Further, as best illustrated in FIG. 6, the lift 10 when in an elevated position thereof does not preclude use of a trailer hitch 94 of the motor home 14 for engagement to a towable carrier such as a boat trailer, etc. Thus, not only can one desired item be carried on the lift 10, but a second desired item may be trailered therebehind.

As described above, the lift 10 of the present invention provides a number of advantages, some of which are described above and others of which are inherent in the invention. Also, modifications may be proposed to the lift 10 without departing from the teachings herein. Accordingly the scope of the invention is only to be limited as necessitated by the accompanying claims.

I claim:

1. A hydraulic lift for use in lifting and transporting a desired structure thereon behind a motor home, the lift comprising:

a plurality of interchangeable planar structure engaging platforms, each of one piece construction and each being maintained horizontal at all times;

a fixed framework engaged to a rear end of said motor home and having arms engageable to a desired one of the plurality of structure engaging platforms;

each arm including an upper shaft and a lower shaft, each pivotably engaged at one end of a fixed framework bracket and each pivotably engaged at another end to a platform engaging bracket;

the arms being pivotable between a ground engaging position wherein the platform rests horizontally on the ground and an elevated, locked in place transport position;

said arms being pivoted by a hydraulic system functionally engaged to and between said pivotable arms and said fixed framework causing the platform to rise when actuated;

said hydraulic system comprising a piston and cylinder arrangement; and said cylinder being pivotably engaged to said fixed framework below pivot points of the upper shafts to said fixed framework.

2. The lift according to claim 1, wherein the upper shaft and lower shaft of each arm are configured in parallelogram form.

3. The lift according to claim 1, wherein a cross brace is provided between the arms.

4. The lift according to claim 3, wherein said cross brace has two ends and includes a finger at each end, said fingers extending downwardly therefrom and being angled toward said fixed framework bracket.

5. The lift according to claim 4, wherein said cylinder is functionally engaged to a source of pressurized hydraulic fluid.

6. The lift according to claim 5, wherein filling of said cylinder with pressurized hydraulic fluid causes extension of said piston.

7. The lift according to claim 6, wherein extension of said piston creates a force against said finger causing said finger to move away from said fixed framework bracket, and inherently producing lift for the pivotable arms.

8. The lift according to claim 7, wherein a locking mechanism is provided for securing said arms in an elevated position thereof.

9. The lift according to claim 8, wherein said locking mechanism comprises a latch pivotably engaged at one end to the upper shaft of the arm and having a jaw thereon, which engages about a cooperating pin on said platform engaging bracket.

10. The lift according to claim 3, wherein each finger pivotably engages the piston of said piston and cylinder arrangement.

* * * * *